United States Patent
Uchino et al.

(10) Patent No.: US 7,830,593 B2
(45) Date of Patent: Nov. 9, 2010

(54) IMAGE DISPLAY DEVICE

(75) Inventors: Satoshi Uchino, Tokyo (JP); Okushi Okuyama, Tokyo (JP); Yukio Hosoya, Tokyo (JP); Hiroyuki Konno, Tokyo (JP); Tatsuya Nagase, Tokyo (JP); Shigeki Takenouchi, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 48 days.

(21) Appl. No.: 12/417,150

(22) Filed: Apr. 2, 2009

(65) Prior Publication Data

US 2009/0251764 A1  Oct. 8, 2009

(30) Foreign Application Priority Data

Apr. 2, 2008  (JP) ............... 2008-095927

(51) Int. Cl.
*G02B 26/00* (2006.01)
*G09G 3/34* (2006.01)
(52) U.S. Cl. ................... 359/296; 345/107
(58) Field of Classification Search ........... 345/107; 359/296

See application file for complete search history.

(56) References Cited

U.S. PATENT DOCUMENTS

| | | | |
|---|---|---|---|
| 5,482,808 A * | 1/1996 | Kondo et al. | 430/108.11 |
| 7,177,582 B2 * | 2/2007 | Ohta et al. | 399/350 |
| 7,183,027 B2 * | 2/2007 | Takegawa et al. | 430/66 |
| 7,457,565 B2 * | 11/2008 | Fujii et al. | 399/159 |
| 2009/0242847 A1 * | 10/2009 | Hosoya et al. | 252/500 |

FOREIGN PATENT DOCUMENTS

| | | |
|---|---|---|
| JP | 2004226768 | 8/2004 |
| WO | 2004077140 | 9/2004 |

\* cited by examiner

*Primary Examiner*—David N Spector
(74) *Attorney, Agent, or Firm*—Lucas & Mercanti, LLP (57) ABSTRACT

An image display device 10, having two substrates 11 and 12, at least one of which is transparent; and display particles 21 and 22 enclosed in the powder form between the substrates, the display particles being moved under an electric field generated between the substrates so that an image is displayed, wherein metal oxide fine particles 1 surface-treated with at least one processing agent selected from the group consisting of silane-coupling agents and silicone oils are adhered to at least one substrate surface 20a and/or 20b of the surfaces in contact with the display particles in a gap 18 between the substrates.

4 Claims, 5 Drawing Sheets

(a) Before application of voltage (b) After application of voltage

(a) Before application of voltage (b) After application of voltage

Fig. 3

(a) Before application of voltage ( Switch OFF )

(b) After application of voltage ( Switch ON )

Fig. 4

SQUARE CELL
LATTICE ARRANGEMENT

SQUARE CELL
HONEYCOMB
ARRANGEMENT 1

CIRCLE CELL
LATTICE
ARRANGEMENT

SPIRAL CELL

HEXAGONAL CELL
HONEYCOMB
ARRANGEMENT

TRIANGLE CELL
LATTICE
ARRANGEMENT

CIRCLE CELL
HONEYCOMB
ARRANGEMENT

TRIANGLE CELL
HONEYCOMB
ARRANGEMENT

SQUARE CELL
NETWORK
ARRANGEMENT

SQUARE CELL
HONEYCOMB ARRANGEMENT 2

IMAGE DISPLAY DEVICE

This application is based on applications No. 2008-095927 filed in Japan, the contents of which are hereby incorporated by reference.

BACKGROUND OF THE INVENTION

1. Field of the Invention

The present invention relates to an image display device that displays and erases images repeatedly while its display particles are forced to migrate in electric field.

2. Description of the Related Art

Image display devices displaying images while moving display particles in gas phase have been known. The image display devices have two substrates, at least one of which is transparent, and display particles enclosed between them in the powder form, and an image is displayed as an electric field is generated between the substrates and thus, the display particles are forced to migrate and adhere to one of the substrates. In operation of such an image display device, because an electric field is generated by application of voltage between the substrates and the display particles are forced to migrate along the electric field direction, it is possible to display and erase an image repeatedly by properly selecting the direction of the electric field.

However, these conventional devices had a problem that the display particles that have relatively large adhesive force, when adhered to the substrates, remain adhered thereto without migration, leading to deterioration in the contrast between the image and non-image regions.

For that reason, studied was treatment of the substrate surface with hexamethyldisilazane (WO2004/077140 Pamphlet). However, the device was not effective enough in lowering the adhesive force from the beginning, causing the problem of low contrast. In addition, the contrast problem was more distinctive when the image display device was used repeatedly for displaying.

Alternatively, a method of spreading particles having a very small primary particle size on the substrate surface and thus, reducing the contact area of display particles with the substrate and the adhesive force between them was disclosed (Japanese Patent-Application Laid-Open No. 2004-226768). However, such a device was also not effective enough in reducing the adhesive force sufficiently from the beginning, leading to the contrast problem. In addition, the contrast problem was more distinctive when the image display device was used repeatedly for displaying.

BRIEF SUMMARY OF THE INVENTION

An object of the present invention is to provide an image display device allowing display of images superior in the contrast between image and non-image regions repeatedly over an extended period of time.

Means to Solve the Problems

The object of the invention can be achieved by an image display device, composed of
two substrates, at least one of which is transparent; and
display particles enclosed in the powder form between the substrates,
the display particles being moved under an electric field generated between the substrates so that an image is displayed,
wherein metal oxide fine particles surface-treated with at least one processing agent selected from the group consisting of silane-coupling agents and silicone oils are adhered to at least one substrate surface of the surfaces in contact with the display particles in a gap (space) between the substrates.

DETAILED DESCRIPTION OF THE INVENTION

The present invention relates to
an image display device, composed of
two substrates, at least one of which is transparent; and
display particles enclosed in the powder form between the substrates,
the display particles being moved under an electric field generated between the substrates so that an image is displayed,
wherein metal oxide fine particles surface-treated with at least one processing agent selected from the group consisting of silane-coupling agents and silicone oils are adhered to at least one substrate surface of the surfaces in contact with the display particles in a gap (space) between the substrates.

The present invention, in which the adhesive force of the display particles to the adhesion surface is distinctively reduced, allows display of an image superior in the contrast between image and non-image regions repeatedly over an extended period of time. In addition, the operational voltage can be reduced to be relatively low. The property of preserving the favorable initial contrast over an extended period of time will be called contrast stability in the present description.

(Image Display Device)

The image display device according to the present invention is an image display device, having:
two substrates, at least one of which is transparent; and
display particles enclosed in the powder form between the substrates, wherein
an image is displayed while the display particles are moved under an electric field generated between the substrates,
characterized in that particular metal oxide fine particles are adhered to at least one substrate surface of the surfaces in contact with the display particles at the gap between substrates.

Hereinafter, the image display device according to the present invention will be described in detail. The image display device according to the present invention is also called a "powder display".

Figure 1:
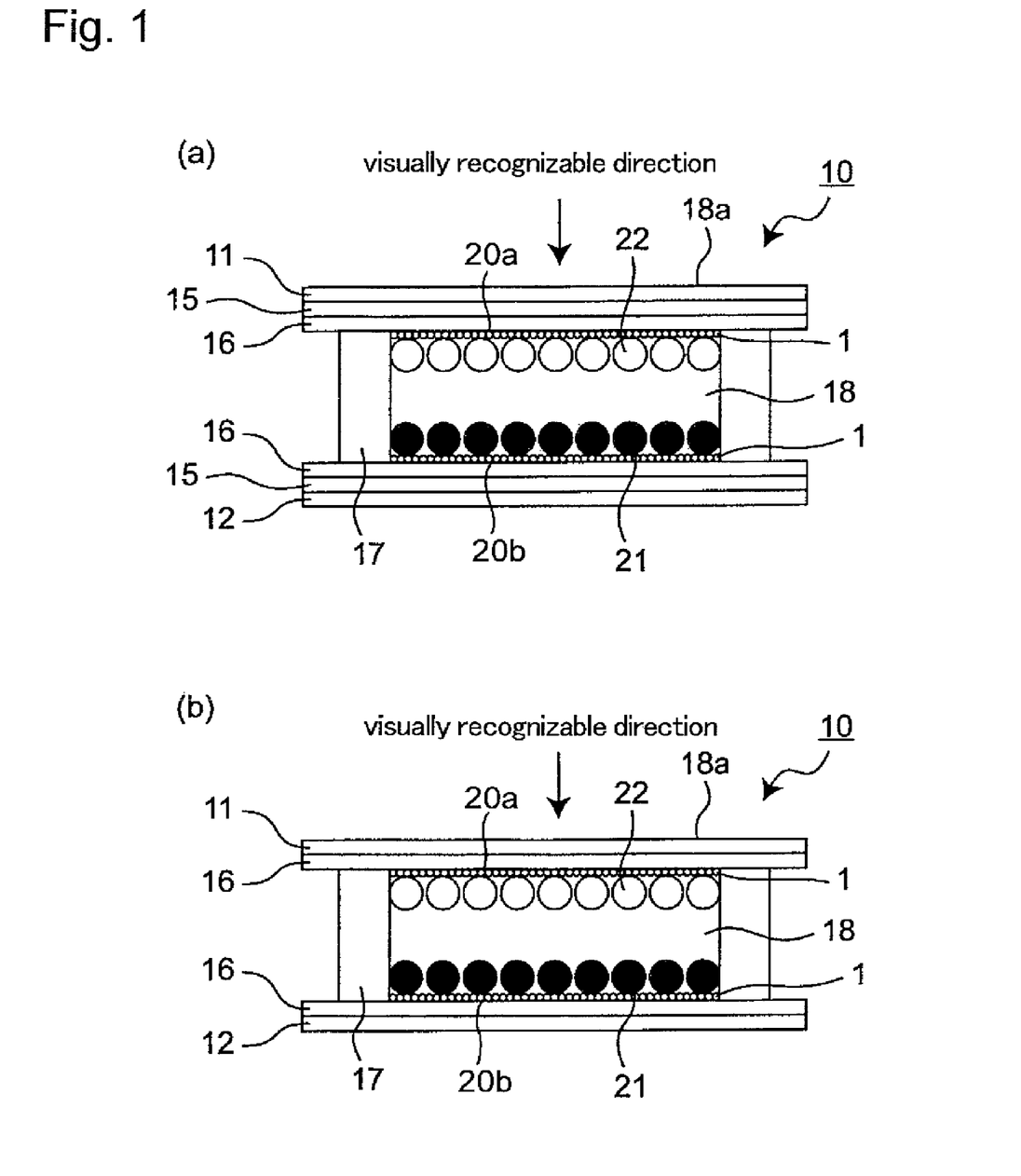
FIG. 1 is schematic views illustrating the crosssectional configuration of an example of the image display device according to the present invention.
Figure 3:
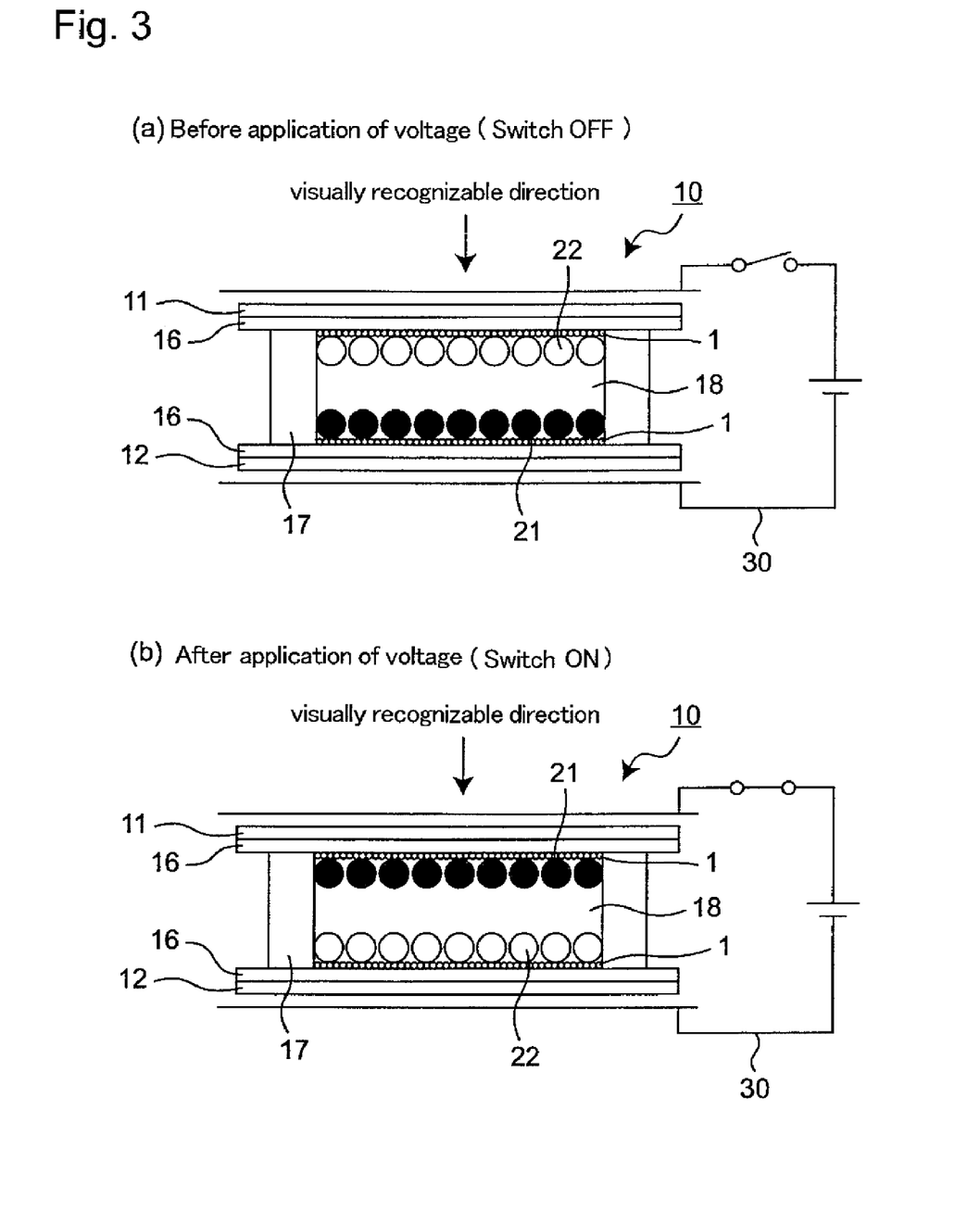
FIG. 3 is schematic views illustrating migration of display particles when voltage is applied between the substrates.

A typical configurational crosssectional view of the image display device according to the present invention is shown in FIG. 1. In FIG. 1(a), electrodes 15 in layer structure are formed on substrates 11 and 12 and insulating layers 16 are formed additionally on the surface of the electrode 15 surface. The image display device shown in FIG. 1(b) is a device wherein no electrode is formed in the image display device of FIG. 1(a), and the display particles are moved by the electric field generated by electrodes formed outside the device. The same numerals in FIG. 1(a) and FIG. 1(b) indicate the same parts. FIG. 1 means both FIGS. 1(a) and 1(b). The image formed in the image display device 10 of FIG. 1 is seen from the side of substrate 11, as shown in the Figure, but the present invention is not limited to observation of the image only from the substrate 11 side. The device shown in FIG. 1(b), in which no electrode 15 is formed, is simplified in its structure, and has an advantage of allowing shortening of its production process. FIG. 3 illustrates the operation when a voltage is applied to the image display device 10 in the type shown in FIG. 1(b) placed in a voltage-applicable apparatus. The cross-sectional configuration of the image display device according to the present invention is not limited to those shown in FIGS. 1(a) and 1(b).

Two substrates 11 and 12, casings constituting the image display device, facing each other are placed in the outermost regions of the image display device 10 of FIG. 1(a). Electrodes 15 for application of voltage are formed on the surfaces of the substrates 11 and 12 facing each other and an insulating layer 16 is formed on each electrode 15. The substrates 11 and 12 respectively have an electrode 15 and an insulating layer 16 formed thereon, and there are display particles enclosed in the gap 18 between the surfaces carrying the electrode 15 and the insulating layer 16.

The two substrates 11 and 12, casings constituting the image display device, facing each other are formed in the outermost regions of the image display device 10 of FIG. 1(b). An insulating layer 16 is formed on the surface of each of the substrates 11 and 12 facing each other. Substrates 11 and 12 respectively have an insulating layer 16, and there are display particles enclosed in the gap 18 between the surfaces carrying the insulating layers 16.

The image display device 10 shown in FIG. 1 contains two kinds of display particles, black display particles (hereinafter, referred to as black particles) 21 and white display particles (hereinafter, referred to as white particles) 22, in the gap 18 as the display particles. The gap 18 in the image display device 10 of FIG. 1 has a structure surrounded by the substrates 11, 12 and two partition walls 17 in four directions and contains the display particles inside.

In the present invention, particular metal oxide fine particles 1 are adhered to at least one substrate surface among the surfaces of the gap 18 in contact with the display particle, forming a metal oxide fine particle layer. The substrate surface means a surface close to the substrate, i.e., a surface almost in parallel with the substrate, and specifically, it means the surfaces 20a and 20b in FIG. 1. In FIGS. 1(a) and 1(b), metal oxide fine particles 1 are adhered to both substrate surfaces 20a and 20b among the surfaces in contact with the display particles at the gap 18, but may be adhered to at least one substrate surface, and preferably adhered at least to the substrate surface 20a in upstream of the visually recognizable direction. It leads to drastic improvement in the contrast between the image and non-image regions, giving an image sufficiently favorable in contrast not only in the early phase but also after repeated use. The mechanism of such a phenomenon is not understood in detail, but it seems that adhesion of the metal oxide fine particles surface treated with a particular processing agent is distinctively effective in reducing the adhesive force of display particles.

The substrate surface, to which the hydrophobic metal oxide fine particles are adhered, varies according to the structure of the image display device, and may be, for example, the surface of the insulating layer 16, electrode 15, or substrates 11 and/or 12. Specifically, in the case of the image display devices of FIGS. 1(a) and 1(b) for example, metal oxide fine particles are adhered to the surface of the insulating layer 16. Alternatively, for example if the image display device of FIG. 1(a) has no insulating layer, the metal oxide fine particles are adhered to the surface of the electrode 15. Yet alternatively, for example if the image display device of FIG. 1(b) has no insulating layer, the metal oxide fine particles are adhered to the surface of the substrates 11 and/or 12.

The metal oxide fine particles to be adhered are particles surface-treated with a particular processing agent. Adhesion of metal oxide fine particles not surface-treated does not result in sufficient contrast from the beginning.

The metal oxide fine particles to be surface-treated is preferably silica, titania, alumina, or the like, and particularly preferably silica. The average primary particle size of the metal oxide fine particles is preferably 1 nm or more and less than 100 nm, particularly 5 nm or more and 30 nm or less, from the viewpoint of shape control.

The average primary particle size in the present description is the number average particle size of primary particles that is determined by using LB-550 (manufactured by HORIBA Ltd.).

The processing agent is at least one processing agent selected from the group consisting of silane-coupling agents and silicone oils. Any silane-coupling agent or silicone oil conventionally used for inorganic fine particles externally added as a hydrophobizing agent to the toner particles in the field of electrophotographic toner may be used as silane-coupling agents or silicone oils.

Specific examples of the silane-coupling agents include dimethyl dichlorosilane, hexamethyldisilazane, methacrylsilane, octylsilane and the like.

Specific examples of the silicone oils include methyl hydrogen silicone oils, carbinol-modified silicone oils, epoxy-modified silicone oils and the like. Commercially available silicone oils such as KF-99, X-22-4039, KF-101, and X-22-170BX (manufactured by Shin-Etsu Chemical Co., Ltd.) and FZ-3704 and SF8411FLUID (manufactured by Dow Corning Toray Co., Ltd.) are also usable.

The surface treatment may be carried out by adding a processing agent to metal oxide fine particles, mixing the mixture sufficiently, and drying and pulverizing the mixture. The addition amount of the processing agent may be an amount desired for surface coating of the metal oxide fine particles, and is normally 1 to 50 wt % with respect to the metal oxide fine particles to be treated. An addition amount of less than 1 wt % leads to indefinite treatment effect, while that of more than 50 wt % leads to saturation of the effect. The processing agents may be used in combination of two or more, and in such a case, the total amount thereof is favorably in the range above. The average primary particle size of the metal oxide fine particles remains almost unchanged even after such a surface treatment.

The degree of surface treatment is not particularly limited, but, the surface-treated metal oxide fine particles (referred to as hydrophobic metal oxide fine particles in the present description) preferably have a hydrophobicity coefficient of 40 to 95.

The hydrophobicity coefficient is a value determined by a methanol wettability method, an indicator showing wettability to methanol. In the methanol wettability method, 0.2 g of inorganic fine particles to be measured are first weighed and added to 50 ml of distilled water placed in a beaker having a capacity of 200 ml. Then, methanol is added slowly dropwise through a burette with the tip thereof dipped into the liquid while the particles are agitated gently, until the entire inorganic fine particles are wetted. When the amount of methanol needed for wetting the inorganic fine particle completely is designated as a (ml), the hydrophobicity coefficient is calculated by the following Formula (1):

$$\text{Hydrophobicity coefficient} = \{a/(a+50)\} \times 10 \quad (1)$$

The hydrophobic metal oxide fine particles can be adhered onto a desired surface, while the dispersion liquid of the fine particles is coated and dried thereon. Such a treatment normally gives a layer of the primary particles of the fine particles as shown in FIG. 1. The adhesive force of the hydrophobic metal oxide fine particles is based on the Van der Waals force etc. between the particles and the adhesion surface, and thus only coating and drying of the dispersion liquid is sufficient for giving a primary particle layer having sufficient adhesive force.

The solvent used for dispersing the hydrophobic metal oxide fine particles is not particularly limited, and an organic solvent may be used. Specific examples of such organic solvents include tetrahydrofuran, acetone, MEK, cyclohexanone, toluene and the like.

The concentration of the fine particles in the dispersion liquid is not particularly limited, but is preferably 0.5 to 10 wt %, particularly 1 to 5 wt %, from the viewpoints of the initial contrast and the contrast stability of the primary particle layer formed.

The adhesion amount of the hydrophobic metal oxide fine particles is not particularly limited as long as the object of the present invention is achieved, and it is normally an amount that the fine particle-adhered surface has a contact angle with water of 110 to 170°, preferably 130 to 160°, more preferably 150 to 160°. There is mutual correlation among the adhesion amount, the contact angle with water, and the concentration of the dispersion coated. That is, increase in concentration of the hydrophobic metal oxide fine particles leads to increase in adhesion amount, which in turn leads to increase in the contact angle with water. On the other hand, decrease in the concentration leads to decrease in the adhesion amount, and consequently to decrease in the contact angle with water.

It is to be noted that in the case where the hydrophobic metal oxide fine particles are adhered to the substrate in upstream of the visually recognizable direction, it is required to be transparent.

The thickness of the gap 18 is not particularly limited as long as the enclosed display particles are movable therein and the image contrast is preserved. Normally, the thickness of the gap 18 is 10 μm to 500 μm, preferably 10 μm to 200 μm. The volume occupation rate of the display particles in the gap 18 is 5% to 70%, preferably 10% to 60%. The display particles, when enclosed at a volume occupation rate in the range above, can move smoothly in the gap 18 and give an image superior in contrast.

Hereinafter, the behavior of the display particles in the gap 18 of image display device 10 will be described.

In the image display device according to the present invention, when an electric field is generated between two substrates as voltage is applied, charged display particles being present between the substrates migrate along the electric field direction. In this way, an image is displayed while the charged display particles migrate between the substrates, while voltage is applied to the substrates containing the display particles.

An image is displayed in the image display device according to the present invention by the following procedure:
(1) Display particles used as a display medium are converted into charged display particles by a known method such as frictional electrification with carrier.
(2) The charged display particles are enclosed between two substrates facing each other, and a voltage is applied between the substrates in this state.
(3) Application of the voltage between the substrates forms an electric field between them.
(4) An image is displayed while the charged display particles migrate along the electric field direction by Coulomb force as the particles are attracted by the surface of the substrates.
(5) Change in the direction of the electric field between substrates leads to reversal of the moving direction of the charged display particles. Various images can be displayed by switching of the traveling direction.

The method of electrifying the display particles by a known method described above is, for example, a method of electrifying particles by frictional electrification by bringing the display particles into contact with a carrier, a method of electrifying two kinds of colored display particles different in electrostatic property by frictional electrification between the two while the particles are agitated in a shaker, or the like.

Figure 2:
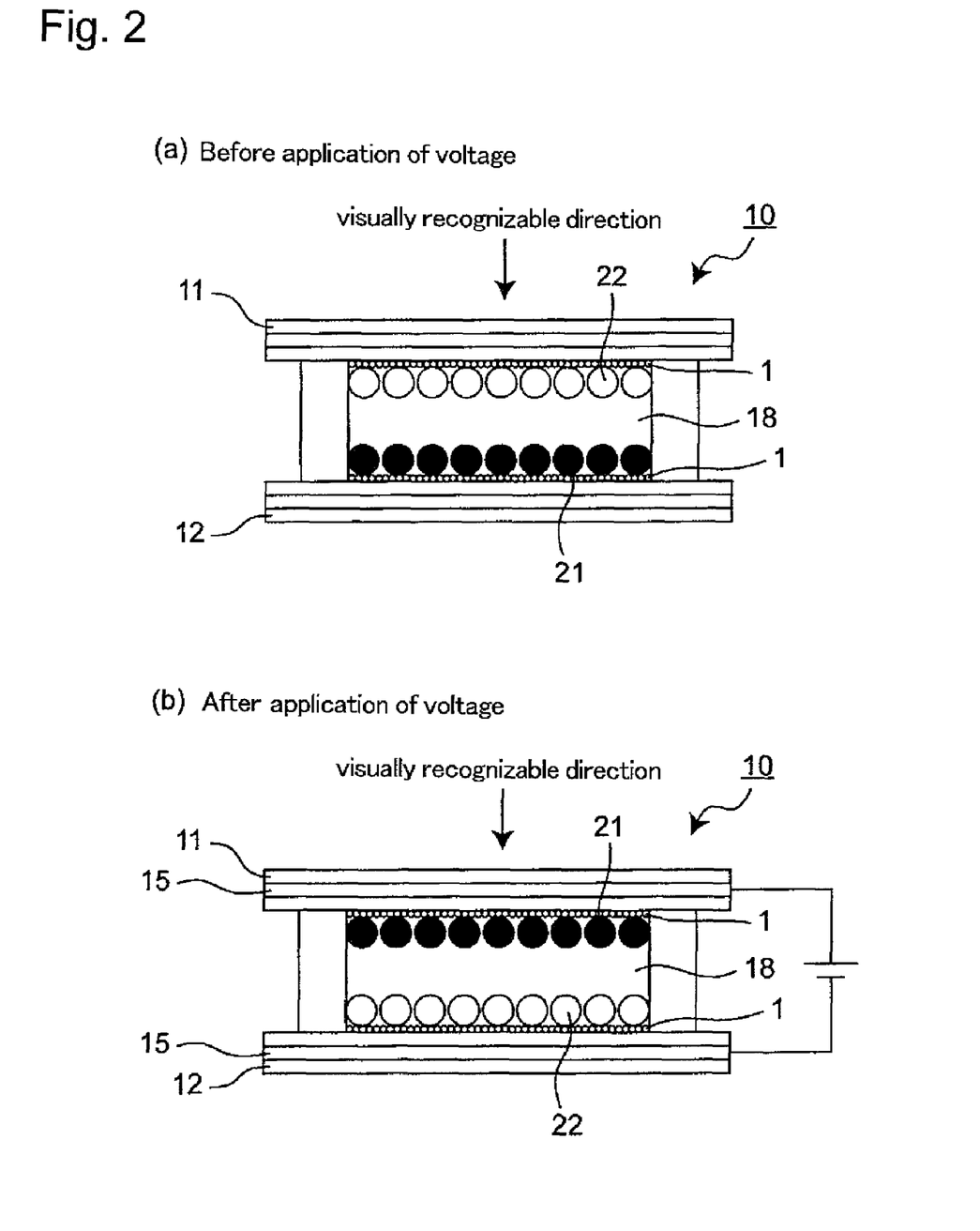
FIG. 2 is schematic views illustrating migration of display particles when voltage is applied between the substrates.

Examples of the migration of the display particle caused by application of voltage between the substrates are shown in FIGS. 2 and 3.

FIG. 2(a) shows the state of the substrates 11 and 12 before application of voltage, in which positively charged white particles 22 are present close to the viewer-side substrate 11. The image display device 10 displays a white image in this state. Alternatively, FIG. 2(b) shows the state after application of voltage to the electrodes 15, in which negatively charged black particles 21 migrate to the area close to the viewer-side substrate 11, while the white particle 22 migrates to the substrate 12 side by voltage application. The image display device 10 displays a black image in this state.

FIG. 3 shows the image display device 10 shown in FIG. 1(b) without any electrode placed in a voltage application apparatus 30 before application of voltage (FIG. 3(a)) and after application of voltage (FIG. 3(b)). Also in the image display device 10 of the type shown in FIG. 1(b), negatively charge black particles 21 migrate to the area close to the viewer-sided substrate 11, while the positively charged white particles 22 migrate to the substrate 12 side by voltage application, similarly to the image display device 10 having electrodes 15.

Hereinafter, the substrates 11 and 12, the electrode 15, the insulating layer 16, the partition wall 17, and the display particles (black particle 21 and white particle 22) constituting the image display device 10 shown in FIG. 1 will be described separately.

First, the substrates 11 and 12 constituting the image display device 10 are explained. In the image display device 10, since a viewer visually recognizes an image formed by the display particles from at least one of the sides of the substrates 11 and 12, the substrate on the side through which the viewer recognizes the image needs to be made from a transparent material. Therefore, the substrate to be used for the side through which the viewer recognizes the image is preferably made from a light-transmitting material having, for example, a visible light transmittance of 80% or more, and by providing the visible light transmittance of 80% or more, it is possible to obtain sufficient visibility. Of the substrates forming the image display device 10, the substrate placed on the side opposite to the image-recognizing side does not need to be made from a transparent material.

The thicknesses of the substrates 11 and 12 are preferably 2 μm to 5 mm respectively, more preferably 5 μm to 2 mm. When the thicknesses of the substrates 11 and 12 are within the above-mentioned range, it is possible to provide a sufficient strength for the image display device 10, and also to maintain the distance between the substrates uniformly. By setting the thicknesses of the substrates within the above-mentioned range, it becomes possible to provide a compact and light-weight image display device, and consequently to accelerate use of the image display device in wider fields. Furthermore, by setting the thickness of the substrate on the image-recognizing side within the above-mentioned range, the displayed image can be visually recognized accurately, without causing any problems in display quality.

Example of the material having a visible light transmittance of 80% or more include inorganic materials having no flexibility, such as glass and quartz, organic materials, typically represented by resin materials to be described later, metal sheets, or the like. Among these, the organic materials and metal sheets may provide a certain degree of flexibility for the image display apparatus. Examples of the resin materials capable of providing a visible light transmittance of 80% or more include polyester resins typically represented by such as polyethylene terephthalate and polyethylene naphthalate, polycarbonate resins, polyether sulfone resins, polyimide resins and the like. Acrylic resins that are polymers of acrylates and methacrylates, typically represented by polymethyl methacrylate (PMMA), and transparent resins obtained by radical-polymerizing a vinyl-based polymerizable monomer, such as a polyethylene resin, may also be included.

The electrodes 15 are provided on the surfaces of the substrates 11 and 12, and used for forming an electric field between the substrates, that is, in a gap 18, by application of a voltage. In the same manner as in the aforementioned substrate, the electrodes 15 that are transparent need to be provided on the image-visible side by the viewer.

The thickness of the electrodes provided on the image-visible side needs to be such a level as to ensure conductivity and as not to cause problems with the light transmitting property, and specifically, it is preferably 3 nm to 1 µm, more preferably 5 nm to 400 nm. The visible light transmittance of the electrodes to be provided on the image-visible side is preferably set to 80% or more in the same manner as in the substrate. The thickness of the electrode to be provided on the side opposite to the image-visible side is also preferably within the above-mentioned range; however, the electrode is not necessarily required to be transparent.

Examples of the constituent material for the electrodes 15 include metal materials, conductive metal oxides, or conductive polymer materials etc. Specific examples of the metal materials include aluminum, silver, nickel, copper and gold, and specific examples of the conductive metal oxides include indium-tin oxides (ITO), indium oxides, antimony-tin oxides (ATO), tin oxides, zinc oxides and the like. Examples of the conductive polymer materials include polyaniline, polypyrrole, polythiophene, polyacetylene and the like.

Examples of the method for forming the electrodes 15 on the substrates 11 and 12 include a sputtering method, a vacuum vapor deposition method, a chemical vapor deposition method (CVD method), a coating method and the like upon providing film-shaped electrodes. A method in which a conductive material is mixed with a solvent or a binder resin and the resulting mixture is applied onto the substrate to form electrodes may also be used.

The hydrophobic metal oxide fine particles 1 are adhered to the surface of the insulating layer, but the insulating layer 16 has not necessarily be formed. In the present invention, the insulating layer is formed for further improvement in initial contrast and contrast stability.

Examples of the material for forming the insulating layer 16 are those materials that have an electrical insulating property, can be formed into a thin film, and are also transparent, if necessary. The insulating layer to be provided on the image-visible side is preferably made to have a visible-light transmittance of 80% or more, in the same manner as in the substrate. Specific examples of the materials thereof include polyamide resins, silicone resins, epoxy resins, polyester resins, polycarbonate resins, acrylic resins and the like.

The thickness of the insulating layer 16 is preferably 0.01 µm or more to 10.0 µm or less. That is, when the thickness of the insulating layer 16 is in the above-mentioned range, the display particles 21 and 22 can be moved without the necessity of applying a high voltage between the electrodes 15, and this thickness is preferable because, for example, an image-displaying operation can be carried out by using a voltage in the same level applied upon forming an image by using an electrophoretic method.

Figure 4:
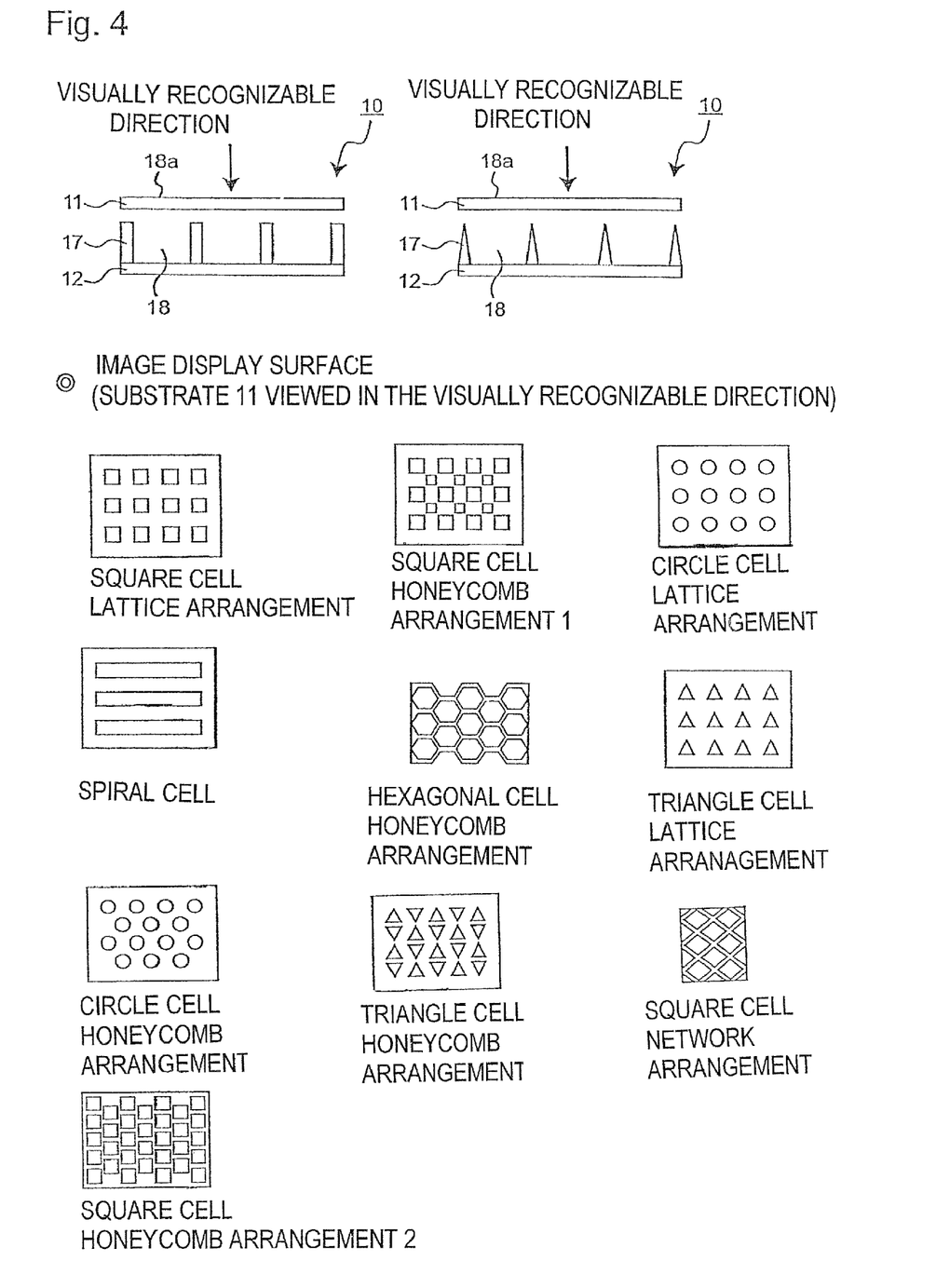
FIG. 4 is schematic views illustrating examples of the configuration of the image display surface.

The partition walls 17, which ensure the gap 18 between the substrates, may be formed not only on the edge portions of the substrates 11 and 12 as shown on the right side and left side of the upper stage of FIG. 4 but also inside thereof, if necessary. The width of the partition walls 17, in particular, the thickness of the partition wall on the image display face 18a side, is desirably made as thin as possible from the viewpoint of ensuring the clearness of a display image, for example, as shown on the right side of the upper stage of FIG. 4.

The partition walls 17 to be formed inside the substrates 11 and 12 may be formed continuously, or may be formed intermittently, in the surface and rear surface direction in the Figure on the right side as well as on the left side on the upper stage of FIG. 4.

By controlling the shape and the arrangement of the partition walls 17, cells to be placed between the gap 18 and separated by the partition walls 17 can be disposed with various shapes. Examples of the shapes and arrangement of the cells, obtained when the gap 18 is viewed in the visually recognizable direction of the substrate 11, are shown in a lower-stage drawing of FIG. 4. As shown in the lower-stage drawing of FIG. 5, a plurality of cells may be arranged in a honeycomb pattern or a network pattern, with a shape, such as a square shape, a triangular shape, a line shape, a round shape and a hexagonal shape.

The partition walls 17 can be formed by processing the surface of the substrate on the side opposite to the image-visible side by using, for example, the following methods. Examples of the methods for forming the partition walls 17 include such as a concave/convex pattern forming process by using an emboss processing and a thermal press-injection molding with a resin material or the like, as well as a photo-lithographic method and a screen printing method.

The display particles include positively charged display particles and negatively charged display particles. Specifically, the display particles used are those containing both display particles positively and negatively charged when brought into contact with each other under friction by mixing or with a standard electrifying material such as iron powder (carrier) under friction. These two kinds of display particles are normally different in electrostatic property and also in color. Thus, it is possible, when an electric field is generated between the substrates in the image display device, to make the display image visually recognizable, based on the colors of the display particles migrating and adhering to the substrate in upstream of the visually recognizable direction and of the display particles remaining adhered to the substrate downstream in the visually recognizable direction. For example, it is possible to make either the positively charged display particles or the negatively charged display particles white and the other black, and the black particles 21 and the white particles 22 are shown in the Figure above.

Each of the positively or negatively charged display particle normally has a base particle and an external additive added thereto. In the present description, the term "display particles" is understood to mean particles including both the positively and negatively charged display particles.

The ratio of the positively charged display particles to the negatively charged display particles is not particularly limited if the object of the present invention is achieved, and is normally 1:1.

The base particle may be a colored resin particle containing at least a resin and a colorant, and may contain additionally additives such as charge-controlling agent and fluorescent brightener as needed. The base particle for the positively charged display particle contains a colorant different in color from that of the base particle for the negatively charged display particle. For example, white and black base particles are used in combination.

The resin constituting the base particle is not particularly limited, and typical examples thereof are polymers so-called vinyl resins described below, and examples thereof include, in addition to the vinyl resins, condensation resins such as polyamide resins, polyester resins, polycarbonate resins, epoxy resins and the like. Specific examples of the vinyl resins include polystyrene resins, polyacrylic resins, polymethacrylic resins, polyolefin resins formed from ethylene and propylene monomers, and the like. Resins other than the vinyl resins include polyether resins, polysulfone resins, polyurethane resins, fluorine resins, silicone resins and the like as well as the condensation resins described above.

The polymer constituting the resin usable in the base particle may be a polymer prepared by using at least one of the polymerizable monomers forming these resins or a polymer prepared in combination of multiple kinds of the polymerizable monomers. When a resin is produced in combination of multiple kinds of polymerizable monomers, it is produced, for example, by a copolymerization method for block copolymer, graft copolymer or random copolymer or by a polymer blend method of blending multiple kinds of resins.

It is possible to control electrostatic properties of the display particles by properly selecting the resin.

Not particularly limited, pigments conventionally known in the field of the electrophotographic toner can be used as a colorant. Among these, examples of a white pigment constituting the white base particles include zinc oxide (zinc white), titanium oxide, antimony white, zinc sulfide, barium titanate, calcium titanate, strontium titanate or the like, and among these, titanium oxide is preferable. Examples of a black pigment constituting the black base particles include carbon black, copper oxide, manganese dioxide, aniline black, active carbon or the like, and among these, carbon black is preferable. Although not particularly limited, the content of the colorant may be, for example, 1 to 200 parts by weight relative to 100 parts by weight of the resin.

Not particularly limited, charge controlling agents conventionally known in the field of the electrophotographic toner may be used as a charge controlling agent. Among these, base particles containing a negative-charge controlling agent, such as, for example, a salicylic acid metal complex, a metal-containing azo dye, a quaternary ammonium salt compound and a nitroimidazole derivative, are likely to be electrified negatively. Base particles containing a positive-charge controlling agent, such as, for example, a nigrosine-based dye, a triphenylmethane compound and a imidazole derivative, are likely to be electrified positively. Although not particularly limited, the content of the charge controlling agent may be, for example, 0.1 to 10 parts by weight relative to 100 parts by weight of the resin.

The method for producing the base particles is not particularly limited, and conventionally known methods for producing particles containing a resin and a colorant, such as, for example, a method for producing toner to be used for forming images in an electrophotographic system, may be applied to be used. Specific methods for producing the base particles include, for example, the following methods.

(1) a method in which, after a resin and a colorant are mixed and kneaded with each other, the resulting kneaded matter is subjected to each of pulverizing and classifying processes so that base particles are produced;

(2) a so-called suspension polymerizing method in which, after a polymerizable monomer and a colorant are mechanically stirred in an aqueous medium to form droplets, a polymerizing process is carried out so that base particles are produced; and (3) a so-called emulsion polymerizing aggregation method in which a polymerizable monomer is dropped into an aqueous medium containing a surfactant so that a polymerizing reaction is carried out in a micelle to produce polymer particles of 100 to 150 nm, and then colorant particles and a coagulant are added thereto so that these particles are aggregated and fused to produce base particles.

The volume average particle size $D1$ of the base particles is 0.1 to 50 μm, preferably 1 to 20 μm from the viewpoint of the facility of migration in electric field and for reduction in fluctuation of image density. The volume average diameter $D1$ of all base particles including those for positively and negatively charged display particles is set to be in the range above.

The volume-average particle size $D1$ of the base particles is indicated by a volume based median diameter (d50 diameter), and can be measured and calculated by using a device in which a data-processing computer system is connected to a Multisizer 3 (made by Beckman Coulter, Inc.).

The measurement procedures are described as follows: After a sample (0.02 g) has been properly mixed with a surfactant solution (20 ml) (used for dispersing particles; a surfactant solution prepared by diluting a neutral detergent containing a surfactant component by 10 times with pure water), this is dispersed by using ultrasonic waves for one minute so that a dispersion solution is prepared. This dispersion solution is injected into a beaker, inside a sample stand, which contains ISOTON II (made by Beckman Coulter, Inc.), by using a pipet, until a measured concentration of 10% is attained, and measurements are carried out with the measuring device counter being set to 2500. The multisizer 3 in which the aperture diameter is set to 50 μm is used.

The external additive for use may be inorganic fine particles or resin fine particles.

The inorganic fine particles for use may be, for example, inorganic fine particles known in the field of electrophotographic toner that have been used as external additive, and examples thereof include metal oxides such as silicon oxide, titanium oxide, aluminum oxide, tin oxide, zirconium oxide and tungsten oxide; nitrides such as titanium nitride; and titanium compounds. The inorganic fine particles are preferably hydrophobic from the viewpoint of improvement in flowability and environment stability. The hydrophobicity can be given by surface-treating the inorganic fine particles with a surface finishing agent such as aminosilane-coupling agent.

The resin fine particles for use may be resin fine particles known in the field of electrophotographic toner that have been used as an external additive, and examples thereof include the fine particles of the resins exemplified as the resins constituting base particles.

The average primary particle size of the external additive is normally 5 to 250 nm, and it is preferable to use those having an average primary particle size of 5 to 100 nm, or to use those having an average primary particle size of 5 to 100 nm and those of 30 nm to 250 nm in combination, from the viewpoint of investment of electrostatic property and improvement in flowability. Thereby, it becomes possible to adjust the electrostatic property and improve the flowability of the display particles, and thus, because the adhesive force of the display particles to the substrates etc. is reduced, the operational voltage is reduced, fluctuation of density is reduced, and the contrast is further improved.

The content of the external additive is preferably 0.1 to 50 parts by weight, particularly 1 to 20 parts by weight, with respect to 100 parts by weight of the base particles, from the viewpoints of adjustment of electrostatic property and improvement in flowability. The external additives may be used in combination of two or more, and in such a case, the total amount is set to be in the above range above.

The image display device can be produced, for example, by the method below:

First, an electrode and an insulating layer are formed as needed on a pair of glass substrates and hydrophobic metal oxide fine particles are adhered thereto by the method described above. Then, the pair of glass substrates are placed with the fine particle-adhered surfaces inside, enclosing display particles in between, and the edges of glass substrate are bonded with partition wall materials (adhesives).

The image display device can be produced also in the electrophotographic method described below.

Figure 5:
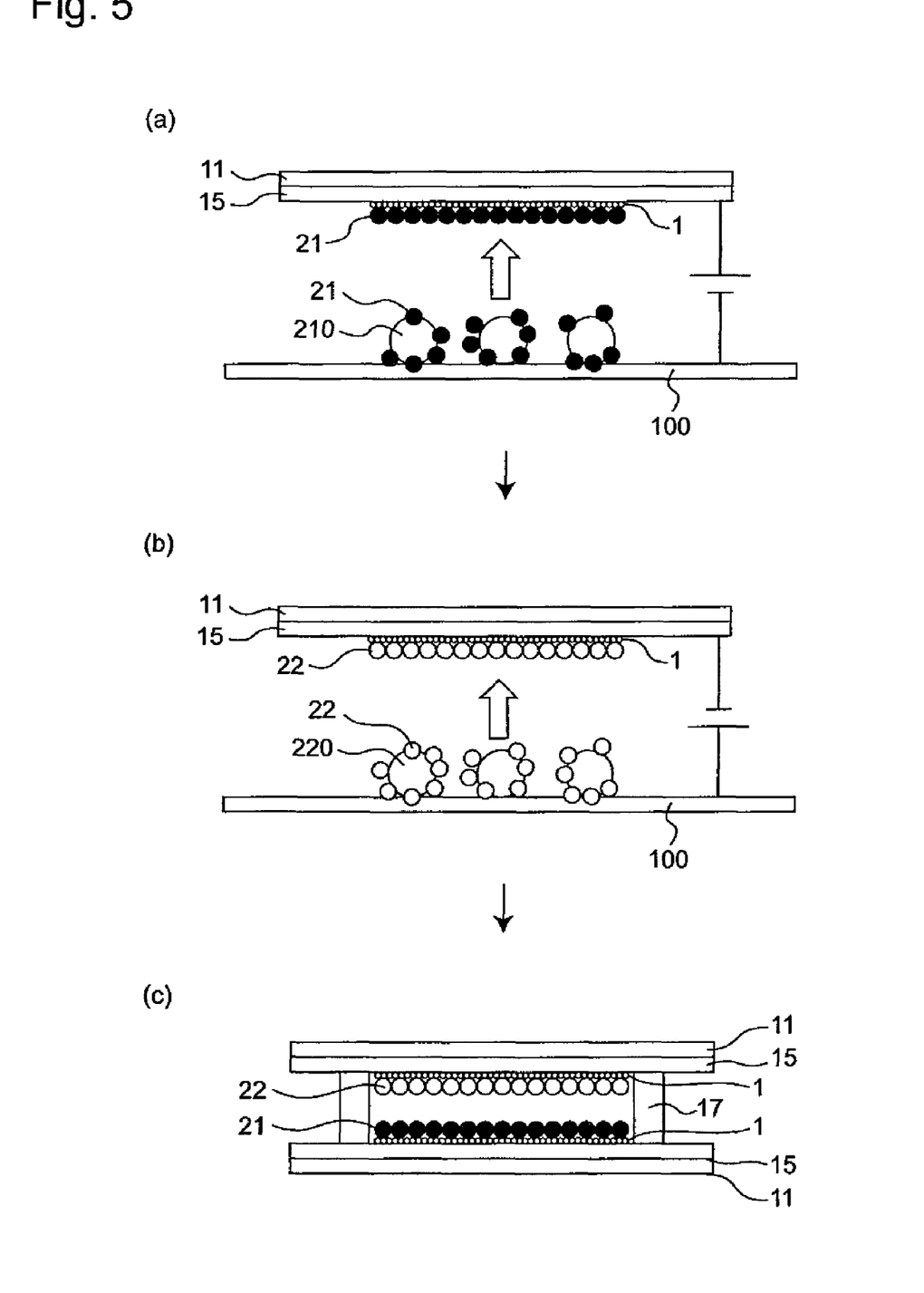
FIG. 5 is schematic views illustrating an example of the method of enclosing display particles.

An electrode 15 and an insulating layer 16, as needed, are formed on two substrates 11 to give a pair of electrode-carrying substrates. Hydrophobic metal oxide fine particles are adhered further thereon by the method above to form an adhesion layer. Display particles 21 are charged negatively by mixing display particles 21 and a carrier 210; the mixture (21 and 210) is placed on a conductive stage 100, as shown in FIG. 5(*a*); and a electrode carrying substrate having the adhesion layer is placed over the stage 100 with a particular gap formed. Then as shown in FIG. 5(*a*), a positive DC voltage and an AC voltage are applied to the electrode 15, allowing adhesion of negatively charged display particles 21 onto the adhesion layer 1.

Display particles 22 are electrified positively by mixing the display particles 22 and a carrier 220; the mixture (22 and 220) is placed on a conductive stage 100 as shown in FIG. 5(*b*); the other electrode-carrying substrate having the adhesion layer is placed over the stage 100 with a particular gap formed. Then, as shown in FIG. 5(*b*), positively charged display particles 22 are adhered onto the adhesion layer 1, while a negative DC voltage and an AC voltage are applied to the electrode 15. The electrode-carrying substrate with negatively charged display particles adhered thereto and the electrode-carrying substrate with positively charged display particle adhered thereto were placed at positions facing each other, with a particular gap formed as shown in FIG. 5(*c*), while the gap distance is adjusted with partition walls, and the edges of the substrates are bonded to each other to give an image display device.

EXAMPLES

Example 1

(Production of White Display Particles)

The following resin and titanium oxide were charged into a Henschel mixer (made by Mitsui Miike Mining Co., Ltd.), and mixed for 5 minutes, with a peripheral velocity of stirring blades being set to 25 m/sec. so that a mixture was produced.

Styrene acrylic resin (weight-average molecular weight 20,000): 100 parts by weight Anatase-type titanium oxide (average primary particle size 150 nm): 30 parts by weight The above-mentioned mixture was kneaded by using a twin-screw extrusion kneader, then coarsely pulverized by a hammer mill, and subjected to a grinding process by using a Turbomill grinder (made by Turbo Kogyo Co., Ltd.) and furthermore subjected to a fine powder classifying process by using an air-flow classifier that utilizes the Coanda effect so that white particles (base particles), having a volume-average particle size of 10.0 μm, were produced. Then, 0.6 parts by weight of aminosilane coupling-treated silica fine particles (average primary particle size: 50 nm) were added to 100 parts by weight of the white particles, and the mixture was mixed in Hybridizer (manufactured by Nara machinery Co., Ltd) at a rotational frequency set to 15,000 rpm for 10 minutes. Subsequently, 1.0 parts by weight of amino-coupling-treated silica fine particles having an average primary particle size of 15 nm were added thereto, and the same processing was repeated to give white display particles.

(Production of Black Display Particles)

The following resin and carbon black were charged into a Henschel mixer (made by Mitsui Miike Mining Co., Ltd.), and mixed for 5 minutes, with a peripheral velocity of stirring blades being set to 25 m/sec. so that a mixture was produced.

Styrene acrylic resin (weight-average molecular weight 20,000): 100 parts by weight Carbon black (average primary particle size 25 nm): 10 parts by weight The above-mentioned mixture was kneaded by using a twin-screw extrusion kneader, then coarsely pulverized by a hammer mill, and then subjected to a coarse grinding process by using a Turbomill grinder (made by Turbo Kogyo Co., Ltd.) and furthermore subjected to a fine powder classifying process by using an air-flow classifier that utilizes the Coanda effect so that black particles (base particles), having a volume-average particle size of 10.0 μm, were produced. Then, 0.6 parts by weight of aminosilane coupling-treated silica fine particles (average primary particle size 50 nm) were added to 100 parts by weight of the black particles, and the mixture was blended in Hybridizer (manufactured by NARA MACHINERY CO., LTD.) at a rotational frequency set to 15,000 rpm for 10 minutes. Subsequently, 1.0 parts by weight of amino-coupling-treated silica fine particles having an average primary particle size of 15 nm were added thereto, and the same processing was repeated to give black display particles.

(Carrier A used for Charging White Display Particles)

To 100 parts by weight of ferrite cores having an average particle size of 80 μm were added 2 parts of fluorinated acrylate resin particles, and these materials were charged into a horizontal rotation blade-type mixing machine, and mixed and stirred for 10 minutes at 22° C., with a peripheral speed of the horizontal rotation blades being set to 8 m/sec., and this was then heated at 90° C., and stirred for 40 minutes so that carrier A was produced.

(Carrier B used for Charging Black Display Particles)

To 100 parts by weight of ferrite cores having an average particle size of 80 μm were added 2 parts of cyclohexyl methacrylate resin particles, and these materials were charged into a horizontal rotation blade-type mixing machine, and mixed and stirred for 10 minutes at 22° C., with a peripheral speed of the horizontal rotation blades being set to 8 m/sec., and this was then heated at 90° C., and stirred for 40 minutes so that carrier B was produced.

(Preparation of Image Display Device)

An image display device similar to that of FIG. 1(a) in structure, except that no insulating layer 16 was formed, was prepared according to the following procedure.

Silica fine particles having an average primary particle size of 12 nm were treated with 30 wt % amount of hexamethyldisilazane to give a hydrophobic silica. The hydrophobicity thereof was 65.

The hydrophobic silica was dispersed in tetrahydrofuran solvent at a concentration of 5 wt % in an ultrasonic homogenizer (manufactured by BRANSON).

The dispersion liquid was applied on each of the electrodes of indium-tin oxide film (ITO; thickness 50 nm) formed on a pair of glass substrates (7 cm×7 cm) by using a spin coater at 2000 rpm and dried thereon at 100° C. for 30 minutes to form an adhesion layer of the hydrophobic silica.

The black display particles (1 g) and 9 g of the carrier B were mixed in a shaker (YS-LD; manufactured by YAYOI CO., LTD.) for 30 minutes, for electrification of the display particles. The mixture (21 and 210) obtained was placed on a conductive stage 100 as shown in FIG. 5(a), and one electrode-carrying substrate having the adhesion layer formed was placed at a gap of approximately 2 mm from the stage 100. A DC bias of +50 V and an AC bias of 2.0 kV at a frequency of 2.0 kHz were applied between the electrode 15 and the stage 100 for 10 seconds, for adhesion of the negatively charged black display particles 21 on the adhesion layer.

The white display particles (1 g) and 9 g of the carrier A were mixed in a shaker (YS-LD; manufactured by YAYOI CO., LTD.) for 30 minutes, for electrification of the display particles. The mixture (22 and 220) obtained was placed on a conductive stage 100 as shown in FIG. 5(b), and the other electrode-carrying substrate having the adhesion layer formed was placed at a gap of approximately 2 mm from the stage 100. A DC bias of −50 V and an AC bias of 2.0 kV at a frequency of 2.0 kHz were applied between the electrode 15 and the stage 100 for 10 seconds, for adhesion of the positively charged white display particles 22 on the adhesion layer.

The electrode-carrying substrate with the black display particles adhered thereto and the electrode-carrying substrate adhered to the white display particles were placed in parallel with a gap of 50 μm, while the gap depth is adjusted with partition walls, as shown in FIG. 5(c), and the edges of the substrates were bonded with an epoxy-based adhesive, to give an image display device. The volume occupation rate of the 2 kinds of display particles between the glass substrates was 50%. The content ratio of the black display particles to the white display particles was adjusted to about 1/1.

Example 2

An image display device was prepared in a manner similar to Example 1, except that an insulating layer was formed between the electrode and the hydrophobic silica by the following method.

An insulating layer having a thickness of 3 μm was formed by spin-coating a resin solution (5 wt %) of a polyamide resin dissolved in ethanol on the electrodes of a pair of glass substrates by using a spin coater.

Example 3

An image display device was prepared in a manner similar to Example 1, except that the dispersion liquid concentration of the hydrophobic silica was 0.5 wt %.

Example 4

An image display device was prepared in a manner similar to Example 1, except that the hydrophobic silica of Example 1 was replaced with hydrophobic anatase titanium oxide fine particles obtained by treating anatase titanium oxide fine particles having an average primary particle size of 20 nm with 30 wt % amount of hexamethyldisilazane.

The hydrophobicity of the hydrophobic anatase titanium oxide fine particles was 60.

Example 5

An image display device was prepared in a manner similar to Example 1, except that the hydrophobic silica of Example 1 was replaced with hydrophobic alumina fine particles obtained by treating alumina fine particles having an average primary particle size of 15 nm with 30 wt % amount of hexamethyldisilazane.

The hydrophobicity of the hydrophobic alumina fine particles was 58.

Example 6

An image display device was prepared in a manner similar to Example 1, except that the treatment of the hydrophobic silica of Example 1 was performed with a 30 wt % methyl hydrogen silicone oil.

The hydrophobicity of the hydrophobic silica fine particles was 63.

Comparative Example 1

An image display device was prepared in a manner similar to Example 1, except that a hexamethyldisilazane film was formed by the following method, replacing the adhesion layer of hydrophobic silica.

Hexamethyldisilazane was applied on the electrodes of a pair of glass substrates by using a spin coater at 5000 rpm and dried thereon at 50° C. for 30 minutes.

Comparative Example 2

An image display device was prepared in a manner similar to Example 1, except that a silica dispersion liquid prepared by the following method was used, replacing the hydrophobic silica dispersion liquid.

Silica (AEROSIL® 200; manufactured by NIPPON AEROSIL CO., LTD.) (hydrophobicity:0) was dispersed in methanol solvent at a concentration of 5 wt % in an ultrasonic homogenizer.

(Evaluation)

The display characteristics of an image display device were evaluated in the following procedure by applying a DC voltage thereto and measuring the reflection density of the display image obtained by voltage application. The voltage applied to the electrode in upstream of the visually recognizable direction in the image display device was altered, and the other electrode was electrically grounded. The density of the image formed on the display surface was measured at arbitrary five positions by using a reflection densitometer (Sakura DENSITMETER® PDA-65; manufactured by Konica Minolta Holdings, Inc.) and the average thereof was used as the density.

Display characteristics examined were contrast and repetition stability.

(Initial Contrast)

The contrast was evaluated based on the difference in density between black and white.

The black density is the reflection density of a display surface when a voltage of +200 V is applied to the electrode in upstream of the visually recognizable direction in the image display device.

The white density is the reflection density of a display surface when a voltage of −200 V is applied to the electrode in upstream of the visually recognizable direction in the image display device.

The contrast was considered to be most excellent (◉) when the density difference is 1.20 or more, excellent (○) when it is 1.15 or more, acceptable (Δ) when it is 1.10 or more, and not acceptable (×) when it is less than 1.10.

(Contrast Stability)

The contrast stability was evaluated based on the difference between the initial contrast and the contrast after voltage application was repeated alternately at +200 V and −200 V for 10,000 times (initial contrast —10,000-time contrast). The contrast stability was considered to be most excellent (◉) when the contrast difference is 0.10 or less, excellent (○) when it is 0.20 or less, acceptable (Δ) when it is 0.30 or less and not acceptable (×) when it is more than 0.30.

(Contact Angle)

During production of the image display device, the contact angle with water of a hydrophobic silica adhesion layer was determined by using a contact angle meter (FACE contact angle meter CA-DT-A type; manufactured by Kyowa Interface Science Co., Ltd.). The contact angle with water of the hexamethyldisilazane film was determined in Comparative Example 1, while that of the silica adhesion layer was determined in Comparative Example 2.

TABLE 1

|  | Initial contrast | Contrast stability | Contact angle |
| --- | --- | --- | --- |
| Example 1 | ◉1.21 | ◉0.05 | 152° |
| Example 2 | ◉1.35 | ◉0.01 | 153° |
| Example 3 | Δ1.10 | Δ0.24 | 110° |
| Example 4 | Δ1.12 | ○0.13 | 141° |
| Example 5 | ○1.15 | Δ0.21 | 139° |
| Example 6 | ◉1.20 | ◉0.08 | 150° |
| Comparative Example 1 | ×1.08 | ×0.37 | 107° |
| Comparative Example 2 | ×0.92 | ×0.53 | 73° |

What is claimed is:

1. An image display device, having
two substrates, at least one of which is transparent; and
display particles enclosed in the powder form between the substrates,
the display particles being moved under an electric field generated between the substrates so that an image is displayed,
wherein metal oxide fine particles surface-treated with at least one processing agent selected from the group consisting of silane-coupling agents and silicone oils are adhered to at least one substrate surface of surfaces in contact with the display particles in a gap between the substrates.

2. The image display device according to claim 1, wherein the surface to which the metal oxide fine particles are adhered is at least the substrate surface in upstream of visually recognizable direction.

3. The image display device according to claim 1, wherein the average primary particle size of the metal oxide fine particles is 1 nm or more and less than 100 nm.

4. The image display device according to claim 1, wherein the metal oxide fine particles are a surface-treated silica.

* * * * *